(12) United States Patent
Hsieh

(10) Patent No.: US 7,724,320 B2
(45) Date of Patent: May 25, 2010

(54) LIQUID CRYSTAL DISPLAY HAVING A LIGHT GUIDE PLATE COMPRISING A PLURALITY OF DOTS EMBEDDED WITH CARBON NANOTUBES CONFIGURED FOR ABSORBING LIGHT BEAMS HAVING LONG WAVELENGTHS

(75) Inventor: Jui-Hua Hsieh, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 79 days.

(21) Appl. No.: 11/985,889

(22) Filed: Nov. 19, 2007

(65) Prior Publication Data

US 2008/0117357 A1 May 22, 2008

(30) Foreign Application Priority Data

Nov. 17, 2006 (CN) .......................... 2006 1 0156918

(51) Int. Cl.
 *G02F 1/335* (2006.01)
 *F21V 7/04* (2006.01)

(52) U.S. Cl. ..................... 349/62; 349/65; 362/623; 362/624; 362/627; 362/628; 362/629; 977/742

(58) Field of Classification Search ................. 362/624, 362/627, 628, 629
See application file for complete search history.

(56) References Cited

U.S. PATENT DOCUMENTS

| 5,956,107 | A | * | 9/1999 | Hashimoto et al. | ............ 349/64 |
|---|---|---|---|---|---|
| 6,396,553 | B1 | | 5/2002 | Maruyama | |
| 2002/0136832 | A1 | * | 9/2002 | Giolando | ............... 427/255.33 |
| 2003/0173985 | A1 | * | 9/2003 | Cole et al. | .................. 324/715 |
| 2004/0136173 | A1 | * | 7/2004 | Tsai | ............................ 362/31 |
| 2004/0136667 | A1 | * | 7/2004 | Leu et al. | ..................... 385/120 |
| 2005/0030444 | A1 | * | 2/2005 | Fujiwara et al. | ................ 349/64 |
| 2005/0214659 | A1 | * | 9/2005 | Andrews et al. | ............... 430/7 |

\* cited by examiner

*Primary Examiner*—Andrew Schechter
*Assistant Examiner*—Dennis Y Kim
(74) *Attorney, Agent, or Firm*—Wei Te Chung

(57) ABSTRACT

An exemplary liquid crystal display (200) includes a liquid crystal panel (210) and a backlight module (220). The backlight module is positioned for illuminating the liquid crystal panel, and includes a light source (222) and at least one optical member (221). The at least one optical member includes absorbing material for absorbing light beams having wavelength more than 700 nanometers, such that when light beams provided by the light source transmit through the at least one optical member, at least some of the light beams having wavelengths more than 700 nanometers are absorbed by the absorbing material.

5 Claims, 5 Drawing Sheets

LIQUID CRYSTAL DISPLAY HAVING A LIGHT GUIDE PLATE COMPRISING A PLURALITY OF DOTS EMBEDDED WITH CARBON NANOTUBES CONFIGURED FOR ABSORBING LIGHT BEAMS HAVING LONG WAVELENGTHS

CROSS-REFERENCE TO RELATED APPLICATION

This application is related to, and claims the benefit of, a foreign priority application filed in China as Serial No. 200610156918.0 on Nov. 17, 2006. The related application is incorporated herein by reference.

FIELD OF THE INVENTION

The present invention relates to liquid crystal displays (LCDs), and more particularly to a liquid crystal display having an optical member capable of absorbing light beams having long wavelengths.

GENERAL BACKGROUND

LCDs are widely used in various modern information products, such as notebooks, personal digital assistants (PDAs), video cameras and the like. The wide usage of the LCD is due to its advantages such as portability, low power consumption, and low radiation. A twisted nematic mode liquid crystal display (TN-LCD) has advantages of low cost and short response time compared with other kinds of LCDs. Therefore, TN-LCDs are particularly popular.

Liquid crystal molecules in a liquid crystal layer of the TN-LCD tilt when an electrical field is applied to the liquid crystal layer. Tilt angles of the liquid crystal molecules are distributed asymmetrically because of the so-called boundary effect. In addition, when light beams pass through the liquid crystal layer, positive phase retardations are generated. This results in viewing angle defects as well as gray-scale inversion in the TN-LCD. To overcome these problems, in general, one or more phase compensation films are added in the TN-LCD.

FIG. 10 is a schematic, exploded side elevation of a conventional LCD. The LCD 100 includes a liquid crystal panel 110, and a backlight module 120 for providing a surface light source to illuminate the liquid crystal panel 110. The liquid crystal panel 110 includes a first polarizer film 111, a first phase compensation film 112, a first substrate 113, a liquid crystal layer 114, a second substrate 115, a second phase compensation film 116, and a second polarizer film 117, disposed in that order from top to bottom. The second polarizer film 117 is disposed adjacent to the backlight module 120. The first phase compensation film 112 and the second phase compensation film 116 are both configured to provide negative phase retardations for light beams passing therethrough, and an optical axis of the first phase compensation film 112 is perpendicular to an optical axis of the second phase compensation film 116.

In operation, light beams provided by the backlight module 120 are transmitted through the second polarizer film 117 and converted to polarized light beams. The polarized light beams pass through the second phase compensation film 116, the second substrate 115, the liquid crystal layer 114, the first substrate 113, and the first phase compensation film 112 sequentially, and then emit from the first polarizer film 111, so as to enable the LCD to function. When the polarized light beams pass through the liquid crystal layer 114, positive phase retardations are generated in the polarized light beams. When the polarized light beams pass through the first phase compensation film 112 and the second phase compensation film 116, negative phase retardations are respectively generated in the polarized light beams. Theses negative phase retardations compensate the positive phase retardations. Thereby, a viewing angle of the LCD 100 is improved.

Refractive indexes of light beams having different wavelengths in the same medium are different, and this impacts optical characteristics of the first and second phase compensation films 112 and 116 as follows. Due to the difference in refractive indexes, while passing through the first and second phase compensation films 112 and 116, negative phase retardations of the polarized light beams having different wavelengths are different, and this further results in differences in polarizing directions of polarized light beams. In particular, polarizing directions of polarized light beams having long wavelengths (for example, more than 700 nm) are not perfectly perpendicular to an optical axis of the first polarizer film 111 when the LCD 100 displays a black image. That is, such light beams cannot be absorbed by the first polarizer film 111 very efficiently, and a light leakage phenomenon is generated. As a result, the phase compensation films 112 and 116 increase the brightness of the black image displayed by the LCD 100, and reduce a contrast ratio of the LCD 100.

It is, therefore, desired to provide an LCD which overcomes the above-described deficiencies.

SUMMARY

In a first aspect, a liquid crystal display includes a liquid crystal panel and a backlight module. The backlight module is positioned for illuminating the liquid crystal panel, and includes a light source and at least one optical member. The at least one optical member includes absorbing material for absorbing light beams having wavelength more than 700 nanometers, such that when light beams provided by the light source transmit through the at least one optical member, at least some of the light beams having wavelengths more than 700 nanometers are absorbed by the absorbing material.

In a second aspect, a liquid crystal display includes a liquid crystal panel and a backlight module. The liquid crystal panel includes a liquid crystal layer and at least one optical member. The backlight module is used for providing a surface light source for the liquid crystal panel. The at least one optical member includes absorbing material configured for absorbing light beams having wavelengths more than 700 nanometers, such that when light beams provided by the backlight module transmit through the at least one optical member, at least some of the light beams having wavelengths more than 700 nanometers are absorbed by the absorbing material.

In a third aspect, a liquid crystal display includes a light source and at least one optical member. The light source is configured for providing light beams. Light beams emitting from the light source subsequently transmit through the at least one optical member, and at least some of the light beams having wavelengths more than 700 nanometers are filtered by the at least one optical member.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
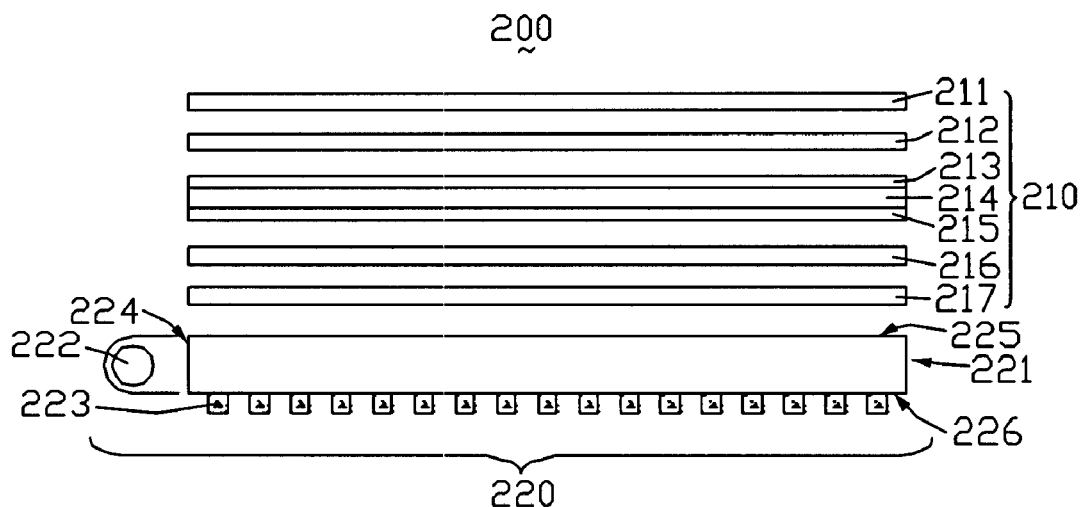
FIG. 1 is a schematic, exploded side elevation of an LCD according to a first embodiment of the present invention.

FIG. 1 is a schematic, exploded side elevation of an LCD 200 according to a first embodiment of the present invention. The LCD 200 includes a liquid crystal panel 210, and a backlight module 220 positioned under the liquid crystal panel 210. The backlight module 220 provides a bright, uniform surface light source for illuminating the liquid crystal panel 210.

The liquid crystal panel 210 includes a first polarizer film 211, a first phase compensation film 212, a first substrate 213, a liquid crystal layer 214, a second substrate 215, a second phase compensation film 216, and a second polarizer film 217, disposed in that order from top to bottom. The second polarizer film 217 is disposed adjacent to the backlight module 220, and is used to convert non-polarized light beams provided by the backlight module 217 to polarized light beams. The first and second substrates 213 and 215 are spatially opposite to each other, so as to seal the liquid crystal layer 214 therebetween. The liquid crystal layer 214 is configured for changing the polarizing direction of the polarized light beams. The first and second phase compensation films 212 and 216 are used to provide negative phase retardations of the polarized light beams passing therethrough, and an optical axis of the first phase compensation film 212 is perpendicular to an optical axis of the second phase compensation film 216. The first polarizer film 211 serves as a light switch. In particular, the first polarizer film 211 prevents the polarized light beams from emitting from the liquid crystal panel 210 when the LCD 200 displays a black image, and controls the amount of polarized light beams emitting from the liquid crystal panel 210 when the LCD 200 displays a normal image.

The backlight module 220 includes a light guide plate (LGP) 221 and a light source 222. The light source 222 is typically a cold cathode fluorescent lamp (CCFL). The LGP 221 is typically made of polymethyl methacrylate (PMMA), and includes a top light emitting surface 225, a bottom surface 226, a light incident surface 224, and a plurality of dots 223.

The light emitting surface 225 is adjacent to the second polarizer film 217. The light incident surface 224 is adjacent to the light source 222, and adjoins both the light emitting surface 225 and the bottom surface 226. The dots 223 are disposed on the bottom surface 226.

The dots 223 are made from printing material via a printing process. The printing material can for example be printing ink that is produced by mixing fine particles of a light guiding material in a suitable organic resin such as cellulose, ethylene resin, or propylene resin. The printing ink includes absorbing material capable of absorbing light beams having long wavelengths. The absorbing material can be carbon nanotubes (CNTs) or nano-scale zinc oxide (ZnO) particles, both of which are capable of absorbing light beams having wavelengths greater than 700 nanometers (nm). The absorbing material is added into the printing ink during the process of mixing the fine particles of a light guiding material and the organic resin, so that the absorbing material is uniformly dispersed throughout the mixture. Thus after the dots 223 are manufactured, the absorbing material is distributed throughout the volume of the base material occupied by each dot 223.

In operation, light beams are provided by the light source 222, and transmitted into the LGP 221 via the light incident surface 224. In the LGP 221, some light beams are transmitted to the dots 223, and then are scattered by the dots 223. During the scattering, light beams having long wavelengths (for example, more than 700 nm) are absorbed by the absorbing material in the dots 223. Light beams that are not absorbed by the absorbing material, together with light beams not transmitted to the dots 223, are guided by the LGP 221 to emit from the light emitting surface 225. The light beams then enter the liquid crystal panel 210.

In the liquid crystal panel 210, the light beams are transmitted through the second polarizer film 217 and are converted to polarized light beams. The polarized light beams then pass through the second phase compensation film 216, the second substrate 215, the liquid crystal layer 214, the first substrate 213, and the first phase compensation film 212 sequentially, and emit from the first polarizer film 211, so as to enable the LCD 200 to function.

When the polarized light beams pass through the liquid crystal layer 214, positive phase retardations are generated in the polarized light beams. When the polarized light beams pass through the second phase compensation film 216 and the first phase compensation film 212, negative phase retardations are respectively generated in the polarized light beams. These negative phase retardations substantially compensate the positive phase retardations. Thereby, a viewing angle of the LCD 200 is improved.

In the LCD 200, some of the light beams that have wavelengths more than 700 nm are absorbed by the absorbing material in the dots 223 before they can exit from the LGP 221. Therefore the light beams provided by the backlight module 220 include few light beams having wavelengths more than 700 nm. Polarizing directions of light beams having wavelengths more than 700 nm are liable to not be perfectly perpendicular to an optical axis of the first polarizer film 211, such that these light beams emit from the first polarizer film 211 even if a black image is displayed. That is, light beams having wavelengths more than 700 nm are apt to generate a light leakage phenomenon. Thus in the backlight module 220, any light leakage phenomenon is minimized or even eliminated. Therefore, when the LCD 200 displays a black image, the light transmission and the brightness of the LCD 200 are both reduced, so that the contrast ratio and the display quality of the LCD 200 are improved.

Furthermore, during the manufacturing of the LGP 221, the amount of absorbing material added into the printing material can be accurately controlled. This helps ensure the brightness of the LCD 200 is not unduly reduced when the LCD 200 displays a white image.

Figure 2:
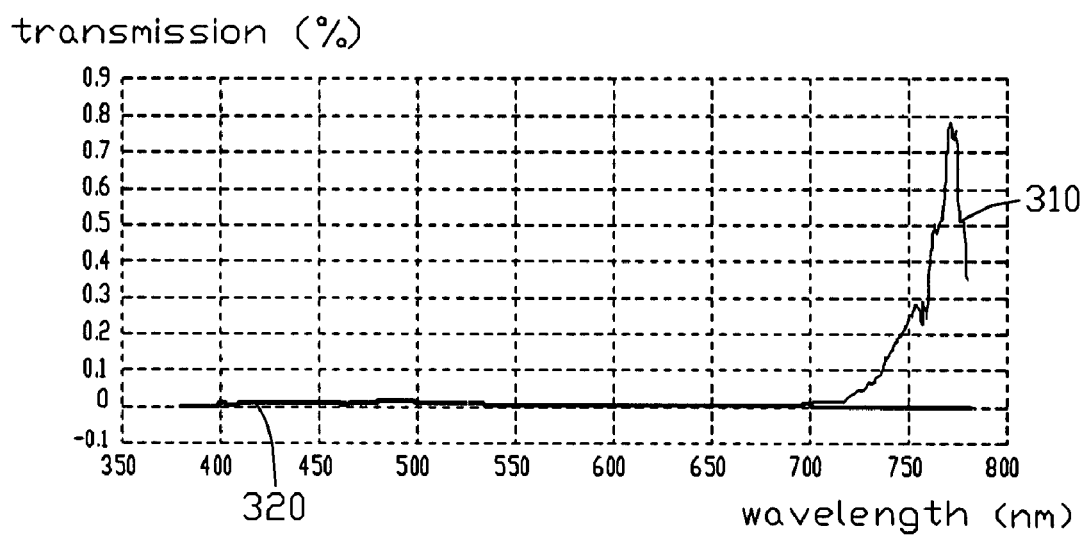
FIG. 2 is a transmission spectrum diagram of the LCD of FIG. 1, showing a relationship between transmission and wavelength of light beams when the LCD displays a black image.

FIG. 2 is a transmission spectrum diagram of the LCD 200, showing a relationship between transmission and wavelength of light beams when the LCD 200 displays a black image. The transmission spectrum diagram includes a first curve 310 and a second curve 320. The first curve 310 indicates the relationship between the transmission and the wavelength when the printing material for making the dots 223 has no absorbing material added therein. The second curve 320 indicates the relationship between the transmission and the wavelength when some nano-scale zinc oxide particles are added in the printing material.

From the transmission spectrum diagram, it can be inferred that the nano-scale zinc oxide particles added in the printing material do not influence the transmission of light beams having wavelengths below 700 nm. This is because the first curve 310 and the second curve 320 are approximately superposed in this part of the spectrum, and the value of the transmission is low. In contrast, it can also be inferred that light beams having wavelengths over 700 nm are greatly absorbed by the nano-scale zinc oxide particles. This is because in the part of the spectrum where the wavelength is more than 700 nm, the transmission in the first curve 310 increases significantly, whereas the transmission in the second curve 320 still remains at a low value.

Figure 3:
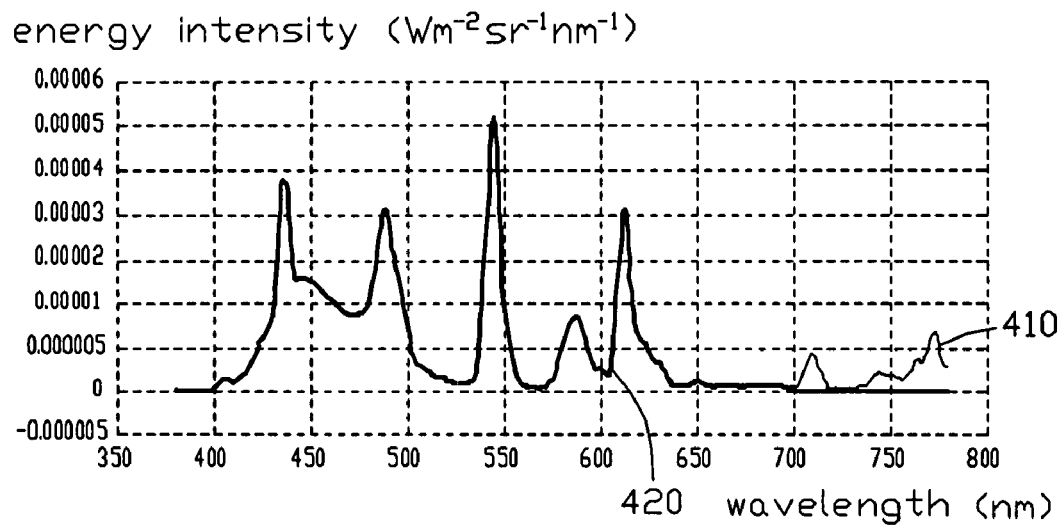
FIG. 3 is an energy intensity spectrum diagram of the LCD of FIG. 1, showing a relationship between energy intensity at the surface of the LCD and wavelength of light beams when the LCD displays a black image.

FIG. 3 is an energy intensity spectrum diagram of the LCD 200 showing a relationship between energy intensity at the surface of the LCD 200 and the wavelength of light beams when the LCD 200 displays a black image. The energy intensity spectrum diagram includes a first curve 410 and a second curve 420. The first curve 410 indicates the relationship between the energy intensity and the wavelength when the printing material for making the dots 223 has no absorbing material added therein. The second curve 420 indicates the relationship between the energy intensity and the wavelength when some nano-scale zinc oxide particles are added in the printing material.

From this energy intensity spectrum diagram, it can be inferred that the nano-scale zinc oxide particles added in the printing material do not influence the energy intensity of light beams having wavelengths below 700 nm. This is because the first curve 410 and the second curve 420 are approximately superposed in this part of the spectrum. In contrast, it can also be inferred that light beams having wavelengths over 700 nm are greatly absorbed by the nano-scale zinc oxide particles. This is because in the part of the spectrum where the wavelengths are more than 700 nm, the energy intensity in the second curve 420 drops to a value approaching zero, while the energy intensity in the first curve 410 still maintains certain positive values. According to integral calculus computations of the spectrum diagram, it can be concluded that the brightness of the black image when some nano-scale zinc oxide particles are added in the printing material drops to a value of about 91% of the brightness of the black image when no absorbing material is added in the printing material.

Figure 4:
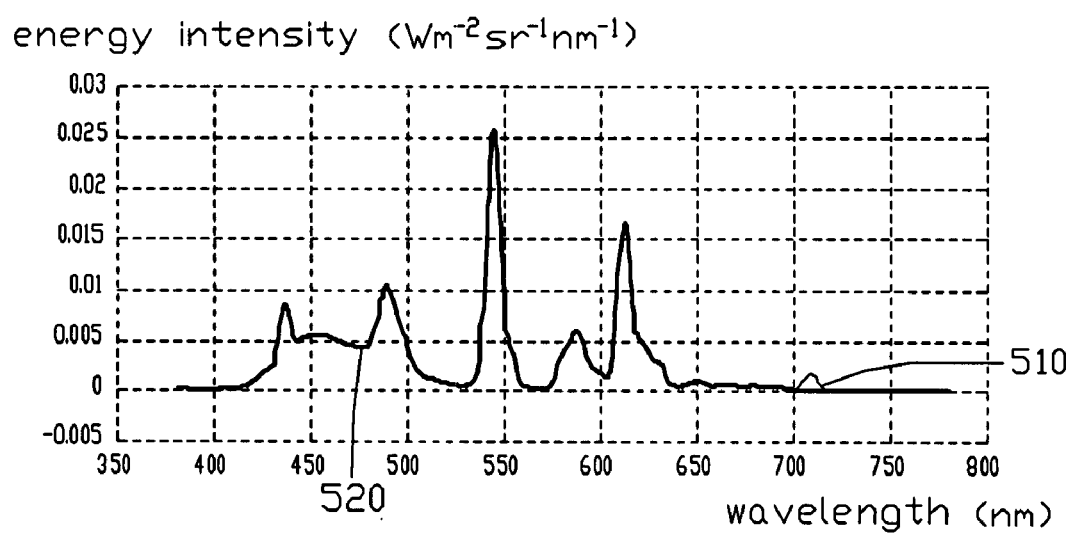
FIG. 4 is an energy intensity spectrum diagram of the LCD of FIG. 1, showing a relationship between energy intensity at the surface of the LCD and wavelength of light beams when the LCD displays a white image.

FIG. 4 is an energy intensity spectrum diagram of the LCD 200, showing a relationship between energy intensity at the surface of the LCD 200 and the wavelength of light beams when the LCD 200 displays a white image. The energy intensity spectrum diagram includes a first curve 510 and a second curve 520. The first curve 510 indicates the relationship between the energy intensity and the wavelength when the printing material for making the dots 223 has no absorbing material added therein. The second curve 520 indicates the relationship between the energy intensity and the wavelength when some nano-scale zinc oxide particles are added in the printing material.

From this energy intensity spectrum diagram, it can be inferred that the nano-scale zinc oxide particles added in the printing material do not influence the energy intensity of light beams having wavelengths below 700 nm. This is because the first curve 510 and the second curve 520 are approximately superposed in this part of the spectrum. In contrast, it can also be inferred that light beams having wavelengths over 700 nm are greatly absorbed by the nano-scale zinc oxide particles. This is because in the part of the spectrum where the wavelengths are more than 700 nm, the energy intensity in the second curve 520 drops to a value approaching zero, while the energy intensity in the first curve 510 maintains certain positive values. According to integral calculus computations of the spectrum diagram, it can be concluded that the brightness of the white image when some nano-scale zinc oxide particles are added in the printing material drops to a value of about 98.2% of the brightness of the white image when no absorbing material is added in the printing material.

According to the above data, an increase in the contrast ratio the LCD 200 is attained. This increase is approximately 98.2%/91%=108%. That is, when some nano-scale zinc oxide particles are added in the printing material for making the dots 223, the brightness of a black image and the brightness of a white image of the LCD 200 are both reduced. The reduction of the brightness of the black image is much greater than that of the brightness of the white image. As a result, an 8% increase in the contrast ratio can be attained by the LCD 200.

Figure 5:
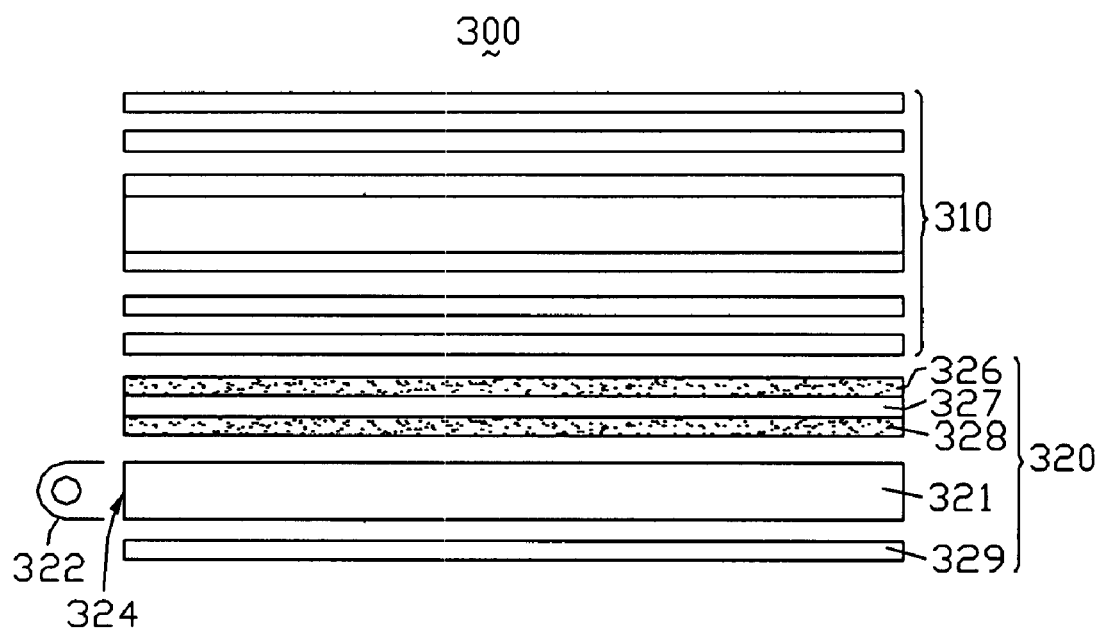
FIG. 5 is a schematic, exploded side elevation of an LCD according to a second embodiment of the present invention.

FIG. 5 is a schematic, exploded side elevation of an LCD 300 according to a second embodiment of the present invention. The LCD 300 is similar to the LCD 200. However, the LCD 300 includes a liquid crystal panel 310 and a backlight module 320. The backlight module 320 includes an LGP 321, a light source 322, a first diffuser sheet 326, a brightness enhancement film (BEF) 327, a second diffuser sheet 328, and a reflector 329. The first diffuser sheet 326, the BEF 327, the second diffuser sheet 328, the LGP 321, and the reflector 329 are disposed in that order from top to bottom. The LGP 321 includes a light incident surface 324, and the light incident surface 324 is adjacent to the light source 322.

The first diffuser sheet 326 and the second diffuser sheet 328 both include absorbing material embedded therein. The absorbing material is capable of absorbing light beams having long wavelengths, particularly light beams having wavelengths more than 700 nm. The absorbing material can be CNTs or nano-scale zinc oxide particles.

Figure 6:
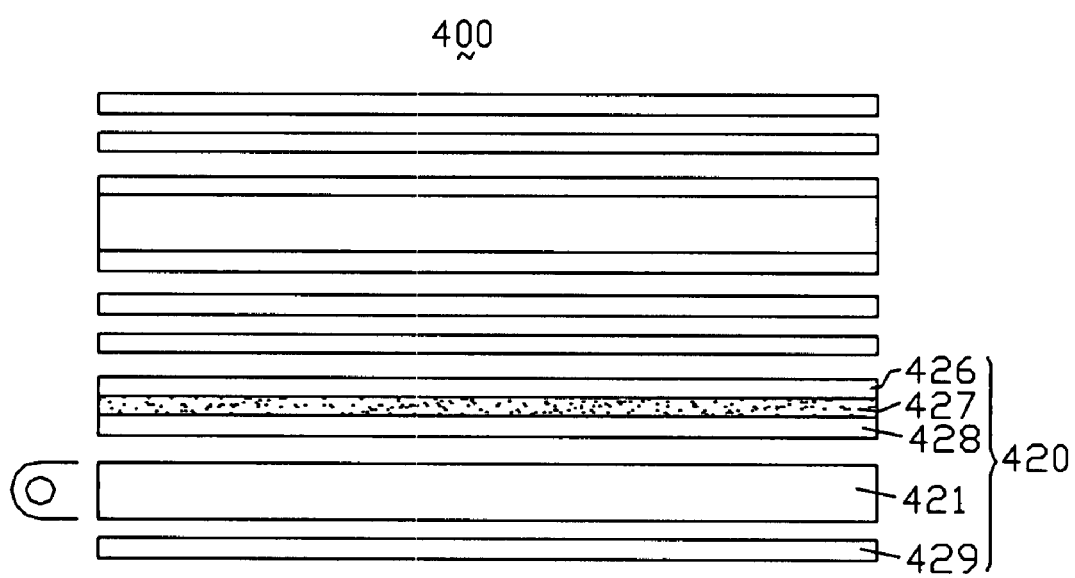
FIG. 6 is a schematic, exploded side elevation of an LCD according to a third embodiment of the present invention.

FIG. 6 is a schematic, exploded side elevation of an LCD 400 according to a third embodiment of the present invention. The LCD 400 is similar to the LCD 300. However, the LCD 400 includes a backlight module 420. The backlight module 420 includes a first diffuser sheet 426, a BEF 427, a second diffuser sheet 428, an LGP 421, and a reflector 429, disposed in that order from top to bottom. The BEF 427 includes absorbing material embedded therein. The absorbing material is capable of absorbing light beams having long wavelengths, particularly light beams having wavelengths more than 700 nm. The absorbing material can be CNTs or nano-scale zinc oxide particles.

Figure 7:
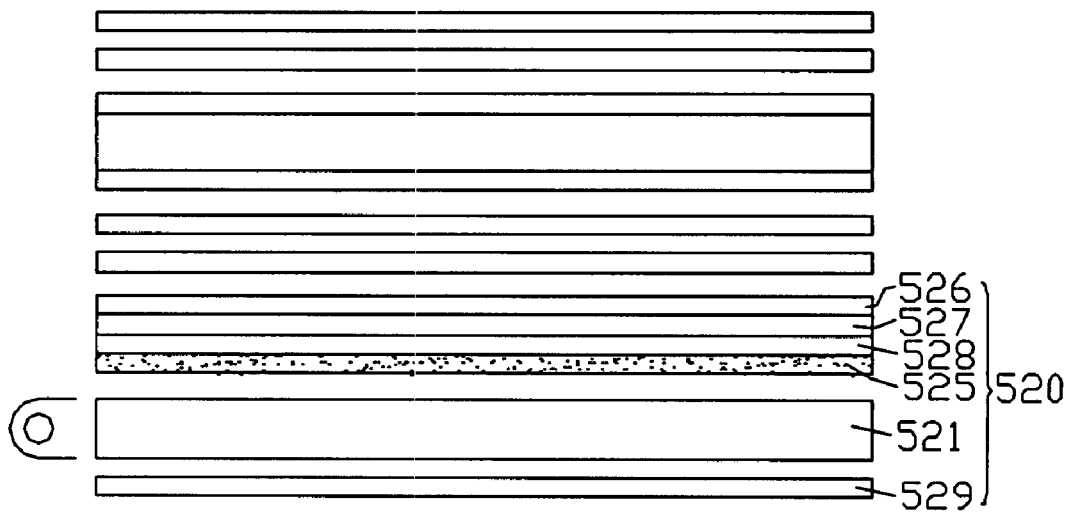
FIG. 7 is a schematic, exploded side elevation of an LCD according to a fourth embodiment of the present invention.

FIG. 7 is a schematic, exploded side elevation of an LCD 500 according to a fourth embodiment of the present invention. The LCD 500 is similar to the LCD 300. However, the LCD 500 includes a backlight module 520. The backlight module 520 includes a first diffuser sheet 526, a BEF 527, a second diffuser sheet 528, a light filter film 525, an LGP 521, and a reflector 529, disposed in that order from top to bottom. The light filter film 525 includes absorbing material embedded therein. The light filter film 525 is used to filter light beams having long wavelengths (for example, more than 700 nm) from the light beams emitting from the LGP 521. Such filtering is achieved via the absorbing material. The absorbing material can be CNTs or nano-scale zinc oxide particles.

Figure 8:
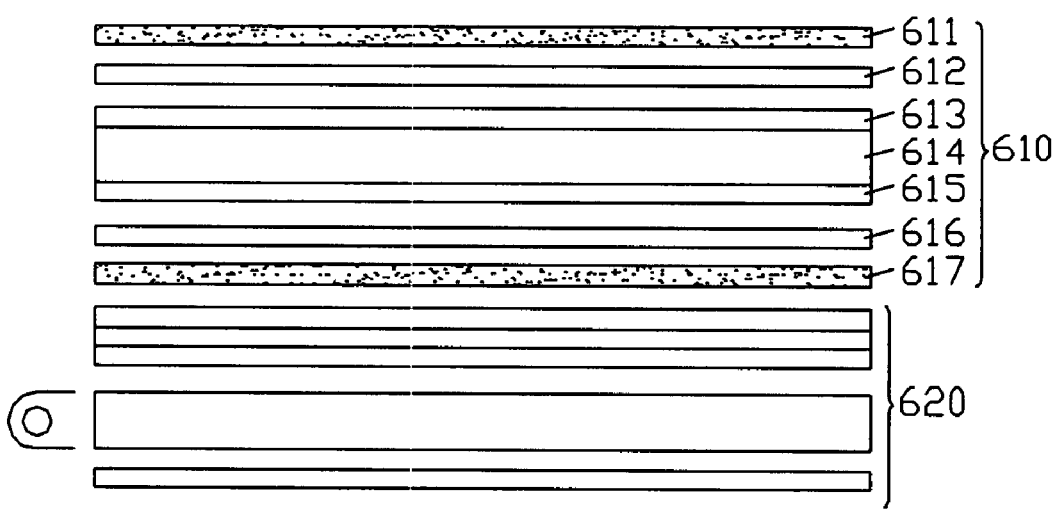
FIG. 8 is a schematic, exploded side elevation of an LCD according to a fifth embodiment of the present invention.

FIG. 8 is a schematic, exploded side elevation of an LCD 600 according to a fifth embodiment of the present invention. The LCD 600 is similar to the LCD 200. However, the LCD 600 includes a liquid crystal panel 610 and a backlight module 620. The liquid crystal panel 610 includes a first polarizer film 611, a first phase compensation film 612, a first substrate 613, a liquid crystal layer 614, a second substrate 615, a second phase compensation film 616, and a second polarizer film 617, disposed in that order from top to bottom. The first polarizer film 611 and the second polarizer film 617 both include absorbing material embedded therein. The absorbing material is capable of absorbing light beams having long wavelengths, particularly light beams having wavelengths more than 700 nm. The absorbing material can be CNTs or nano-scale zinc oxide particles.

Figure 9:
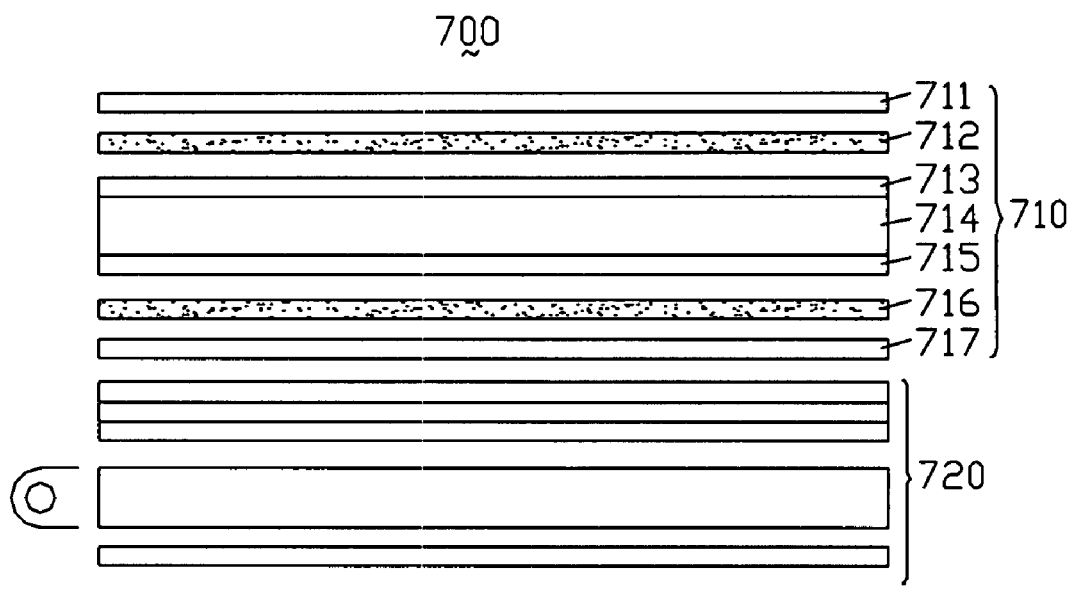
FIG. 9 is a schematic, exploded side elevation of an LCD according to a sixth embodiment of the present invention.
Figure 10:
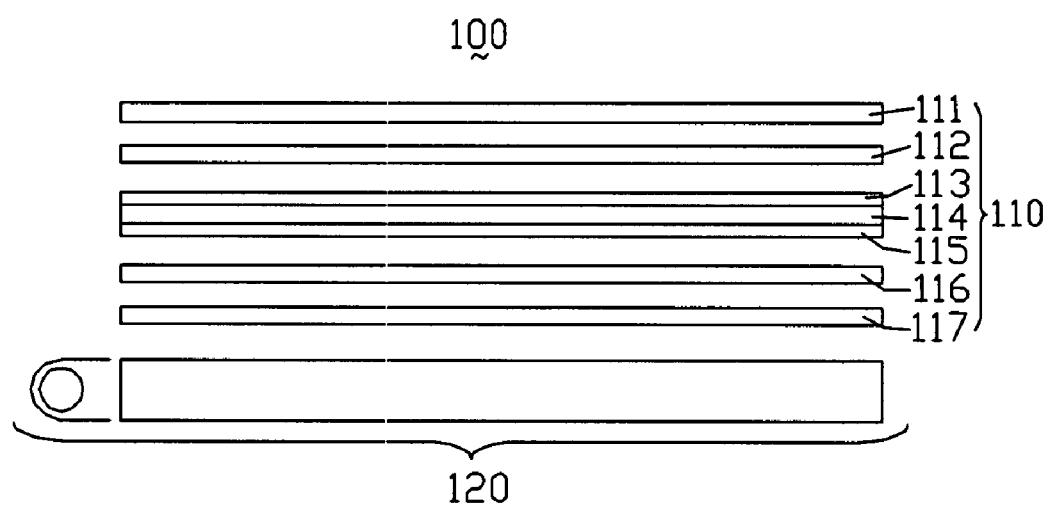
FIG. 10 is a schematic, exploded side elevation of a conventional LCD.

FIG. 9 is a schematic, exploded side elevation of an LCD 700 according to a sixth embodiment of the present invention. The LCD 700 is similar to the LCD 200. However, the LCD 700 includes a liquid crystal panel 710, and a backlight module 720 positioned under the liquid crystal panel 710. The liquid crystal panel 710 includes a first polarizer film 711, a first phase compensation film 712, a first substrate 713, a liquid crystal layer 714, a second substrate 715, a second phase compensation film 716, and a second polarizer film 717, disposed in that order from top to bottom. The first phase compensation film 712 and the second phase compensation film 716 both include absorbing material embedded therein. The absorbing material is capable of absorbing light beams having long wavelengths, particularly light beams having wavelengths more than 700 nm. The absorbing material can be CNTs or nano-scale zinc oxide particles.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of the present invention to the full extent indicated by the broad general meaning of the terms in which the appended claims are expressed.

What is claimed is:

1. A liquid crystal display, comprising:
   a liquid crystal panel; and
   a backlight module positioned for illuminating the liquid crystal panel, the backlight module comprising a light source and at least one optical member;
   wherein the at least one optical member comprises a light guide plate, the light guide plate comprises a plurality of dots disposed thereon, a plurality of carbon nanotubes are embedded in the plurality of dots, and the carbon nanotubes are configured for absorbing light beams having wavelengths more than 700 nanometers, such that when light beams provided by the light source transmit through the light guide plate, at least some of the light beams having wavelengths more than 700 nanometers are absorbed by the carbon nanotubes, and the light beams that are not absorbed by the carbon nanotubes, together with the light beams not transmitted to the plurality of dots, are guided by the light guide plate to emit to the liquid crystal panel.

2. The liquid crystal display as claimed in claim 1, wherein the light guide plate comprises a bottom surface, and the plurality of dots are disposed at the bottom surface.

3. The liquid crystal display as claimed in claim 2, wherein the dots are printed dots.

4. The liquid crystal display as claimed in claim 3, wherein the dots are printing ink dots.

5. The liquid crystal display as claimed in claim 4, wherein the printing ink dots comprise a mixture of organic resin, fine particles of a light guiding material, and the carbon nanotubes.

* * * * *